United States Patent [19]

Fitzgerald et al.

[11] Patent Number: 5,349,675
[45] Date of Patent: Sep. 20, 1994

[54] SYSTEM FOR DIRECTLY DISPLAYING REMOTE SCREEN INFORMATION AND PROVIDING SIMULATED KEYBOARD INPUT BY EXCHANGING HIGH LEVEL COMMANDS

[75] Inventors: Arthur K. Fitzgerald, Raleigh, N.C.; Charles W. Gainey, Jr., Poughkeepsie, N.Y.; William K. Kelley, Wappingers Falls, N.Y.; Samuel L. Wentz, Endwell, N.Y.

[73] Assignee: International Business Machines Corporations, Armonk, N.Y.

[21] Appl. No.: 577,967

[22] Filed: Sep. 4, 1990

[51] Int. Cl.$^5$ ............................................. G06F 15/16
[52] U.S. Cl. ..................................... 395/800; 395/325; 395/500; 395/161; 364/221; 364/DIG. 1
[58] Field of Search ............... 395/800, 600, 325, 161, 395/500; 364/421, 300, 419; 273/85 G; 358/143; 345/196

[56] References Cited

U.S. PATENT DOCUMENTS

| 4,298,939 | 11/1981 | Fluegel | 364/421 |
|---|---|---|---|
| 4,589,068 | 5/1986 | Heinen, Jr. | 364/300 |
| 4,646,235 | 2/1987 | Hirosawa et al. | 395/275 |
| 4,754,428 | 6/1988 | Schultz et al. | 395/275 |
| 4,782,442 | 11/1988 | Kojima et al. | 395/200 |
| 4,791,566 | 12/1988 | Sudama et al. | 395/325 |
| 4,831,582 | 5/1989 | Miller et al. | 395/600 |
| 4,969,083 | 11/1990 | Gates | 364/147 |
| 5,038,318 | 8/1991 | Roseman | 395/375 |
| 5,068,821 | 11/1991 | Sexton et al. | 395/800 |
| 5,127,090 | 6/1992 | Ruehle et al. | 395/325 |
| 5,131,092 | 7/1992 | Sackmann et al. | 395/800 |
| 5,220,657 | 6/1993 | Bly et al. | 395/425 |

FOREIGN PATENT DOCUMENTS 61-6426  2/1986  Japan .
2-87212  9/1988  Japan .

OTHER PUBLICATIONS

Atkinson & Atkinson, Using C, Que Corporation (1990) pp. 9-18, 403-405.
IBM TDB, vol. 27, Aug. 1984, by D. M. Chess & G. Waldbaum "IBM Personal Computer Local/Remote Display & Keyboard Sharing".
"AOMPLUS-2" Hitachi Announcement (VOS3/AS) Mar. 1990.
"AOMPLUS-3" Hitachi Announcement (with M-880) Jun. 1990.
Research Disclosure 24937 "Multi-Party Interactive Display System".

Primary Examiner—Thomas C. Lee
Assistant Examiner—Paul R. Lintz
Attorney, Agent, or Firm—Arthur J. Samodovitz

[57] ABSTRACT

A computer network has a first computer which is locally coupled to a second computer. The first computer controls operation of the second computer according to a plurality of high level commands obtained from a third computer at a central station. The third computer includes apparatus for receiving the high level commands either from a program running on the third computer or an operator interface on the third computer. A communication facility is provided between the third computer and the first computer to transmit the high level commands to the first computer. The first computer includes a plurality of relatively low level programs corresponding respectively to the plurality of high level operation commands. Each of the low level programs implements the corresponding high level command to control operation of the first computer. The first computer also includes means for selecting the corresponding low level program in response to receipt of the high level command. One of the high level commands is Activate, and the corresponding low level program implements power on, initial microprogram load, and initial program load on the second computer in response to the Activate command.

6 Claims, 14 Drawing Sheets

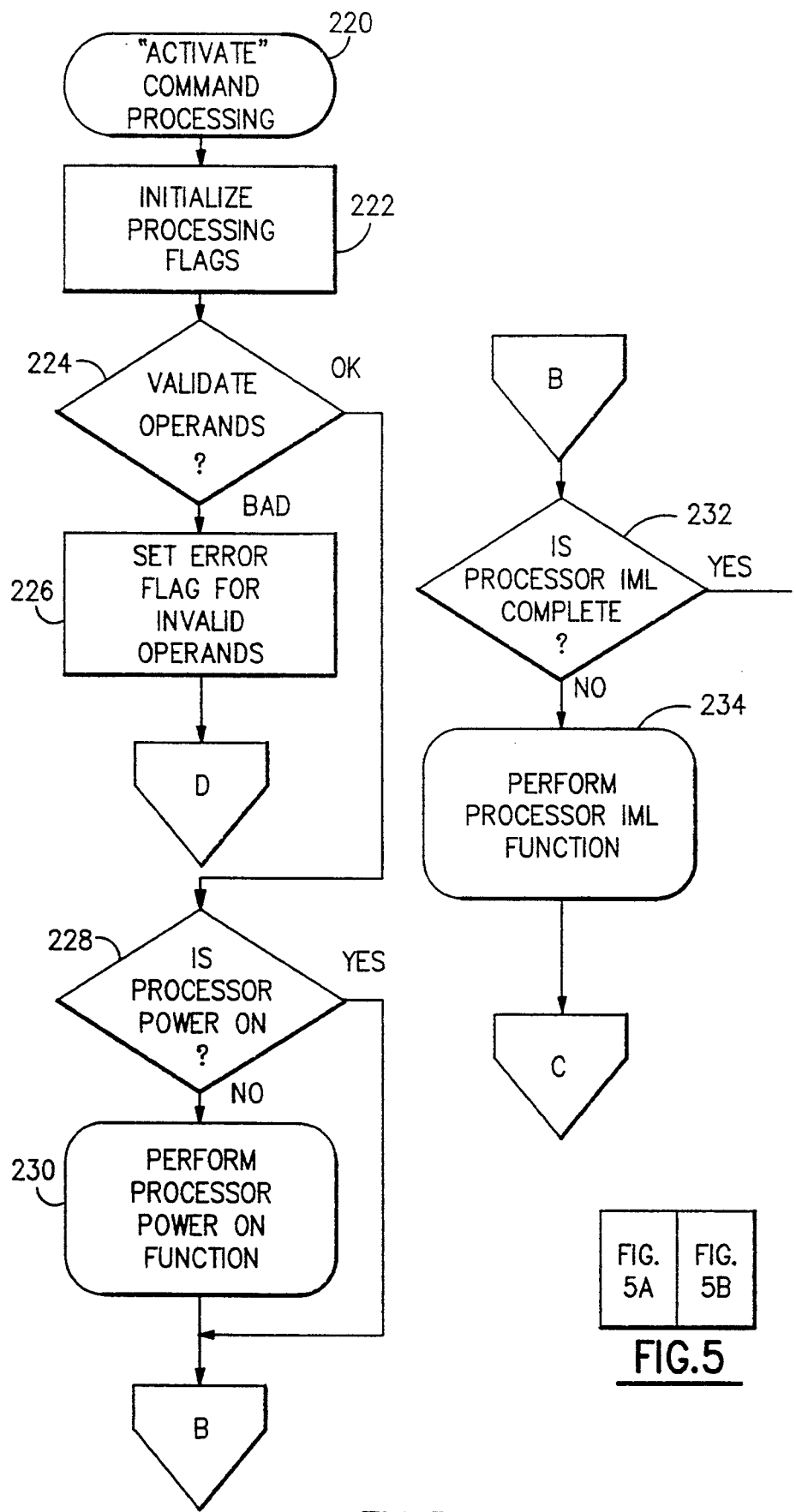

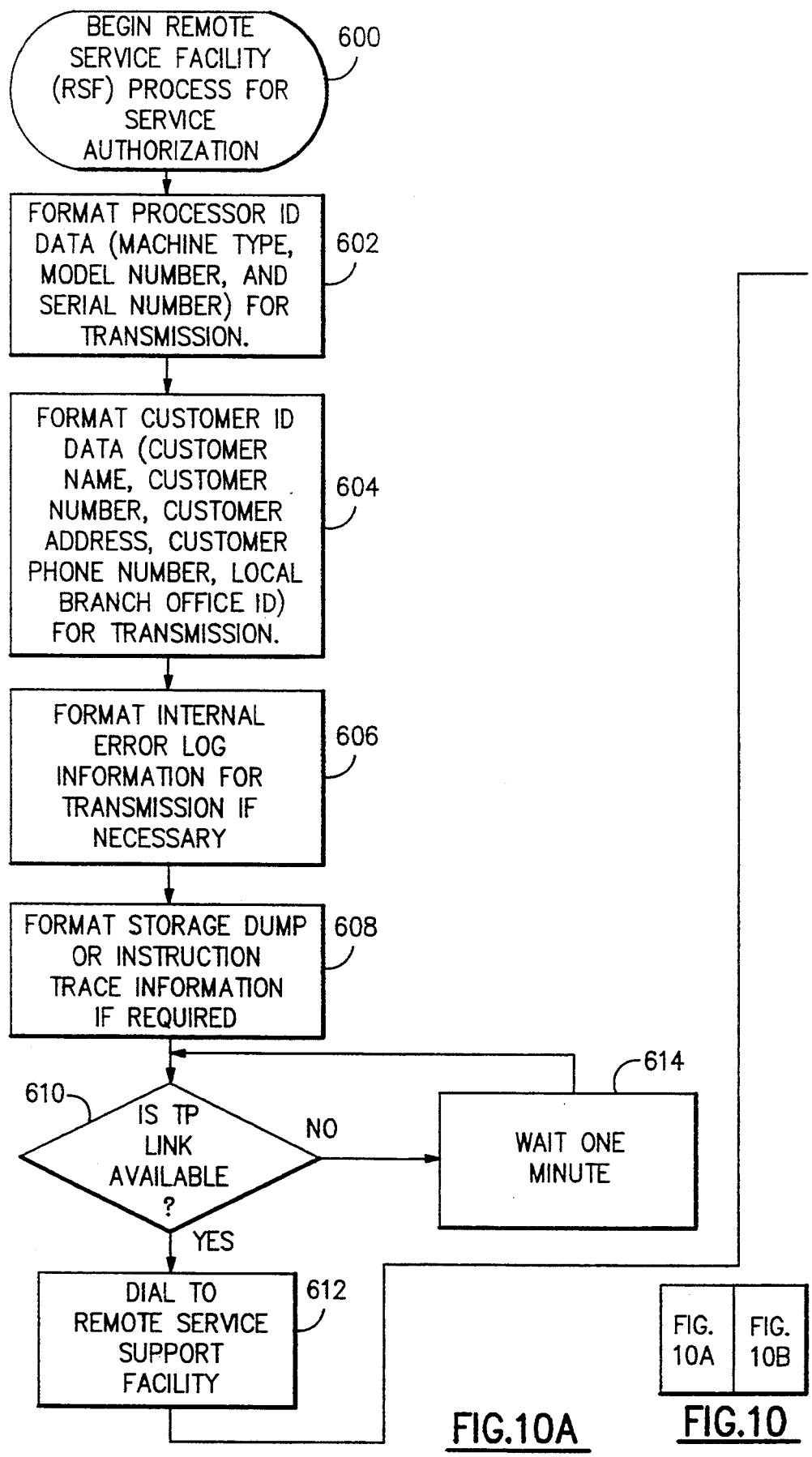

SYSTEM FOR DIRECTLY DISPLAYING REMOTE SCREEN INFORMATION AND PROVIDING SIMULATED KEYBOARD INPUT BY EXCHANGING HIGH LEVEL COMMANDS

BACKGROUND OF THE INVENTION

The invention relates generally to computer systems and networks, and deals more particularly with remote control and operation of a computer processor.

A prior art IBM Computer Network comprises a central computer which provides remote control of an IBM System/370 computer processor. As described in more detail below with reference to FIG. 1, a program running at the central computer or an operator making keyboard inputs at the central computer generates function commands such as load processor, power on, and power off. A Target System Control Facility/Central Site Program (IBM Program Product 5688-139) running on the central computer converts the primitive function commands into corresponding keystrokes and the keystrokes are sent to a personal computer which is local to the System/370 processor. The keystrokes are similar to those that would be generated by an operator making keyboard inputs through a local processor console to locally control the System/370 processor. Then a terminal emulator program running in the personal computer converts the keystrokes to a form which can be read by an operating system of the local processor console which serves the System/370 processor. Then, the local processor console processes the reformatted keystrokes as if they came from the local processor console keyboard. While the aforesaid computer network provides remote control on a computer processor, it requires additional hardware i.e. the personal computer and adapter cards to interface the personal computer to the local processor console, and accompanying programs, microcode and delays.

Accordingly, a general object of the present invention is to provide a more efficient and faster system and network for remotely controlling a computer processor.

SUMMARY OF THE INVENTION

The invention resides in a computer network which provides remote control of operation of a computer processor. The network comprises a first computer which includes means for locally coupling to a second computer. The first computer controls operation of the second computer according to a plurality of high level commands obtained from a third computer at a central station. The third computer includes means for receiving the high level commands either from a program running on the third computer or an operator interface on the third computer. A communication facility is provided between the third computer and the first computer to transmit the high level commands to the first computer. The first computer includes a plurality of relatively low level programs corresponding respectively to the plurality of high level operation commands. Each of the low level programs implements the corresponding high level command to control operation of the first computer. The first computer also includes means for selecting the corresponding low level program in response to receipt of the high level command. One of the high level commands is Activate, and the corresponding low level program implements power on, initial microprogram load, and initial program load on the second computer in response to the Activate command.

According to one feature of the invention, the second computer includes an operating system and another one of the high level commands is a command to query the contents of the operating system operator screen and to transmit operating system operator screen information to the third computer. After receipt of the operating system operator screen information, either an application program or a user at the third computer can supply the requisite information. The requisite information is supplied to the second computer and operating system along with another one of the high level commands which directs the operating system to read the requisite information.

DETAILED DESCRIPTION OF THE PREFERRED EMBODIMENTS

Figure 1:
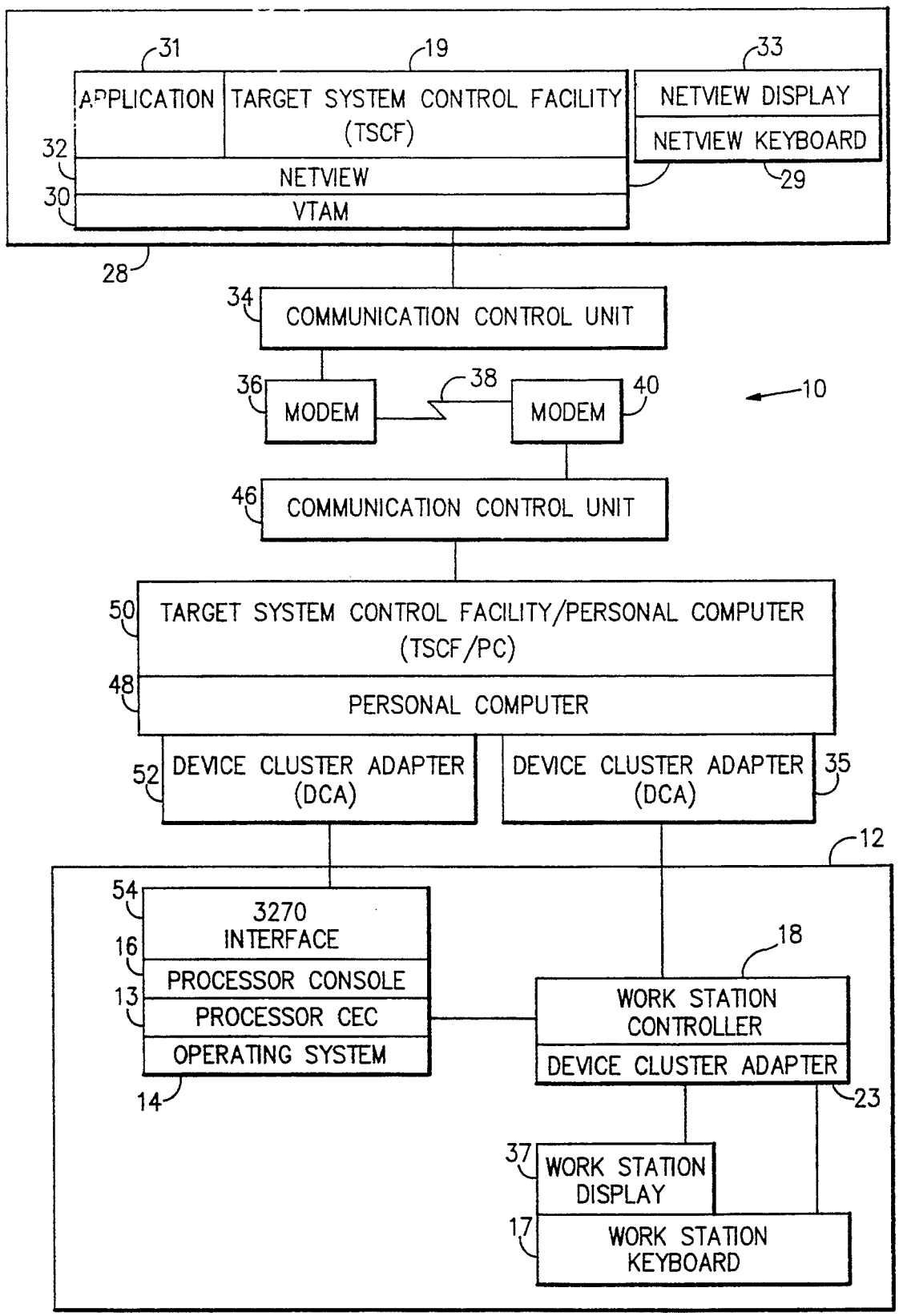
FIG. 1 is a block diagram illustrating a computer network providing remote control of a computer processor according to the prior art.

FIG. 1 illustrates a computer network generally designated 10 according to the prior art, which network provides remote control of a computer system 12. System 12 comprises a System/370 processor 13 with an operating system 14 such as an MVS/ESA ™, VM ™ or VSE operating system. A local processor console 16 is tightly coupled to the processor 13 by a dedicated internal interface and provides local control and operation of processor 13 and programs running on the processor 13.

A Target System Control Facility (TSCF) program 19 runs on a central site computer system 28 and is programmed to receive either keyboard input from an operator at the central computer via keyboard 29 or program inputs from an application program 31 running on the central computer. TSCF is further described in a publication entitled "TSCF General Information", IBM Corp. of Armonk, N.Y., publication #GC28-1063. In either case, the inputs are function commands such as load processor, power on, or power off. Upon receipt of the keyboard inputs, the TSCF program packages the function commands and passes them to NetView TM program 32. TSCF similarly packages the function commands received from the application program. The NetView TM program 32 also runs on central computer 28 and provides an interface for transmitting the packeted function commands to Virtual Telecommunication Access Method (VTAM) communication facility (30). NetView program 32 assists in management of the communication network and is further described in a publication entitled "Network Program Products General Information", IBM Corp. of Armonk, N.Y., publication #GC30-3350. The VTAM communication facility 30 has an application program interface and assists in the communication. For further details of VTAM communication facility 30, reference can be made to "Advanced Communications Functions for VTAM General Information", IBM Corp. of Armonk, N.Y., publication #GC38-0254.

A communication control unit 34 comprises hardware and microcode that handles the actual transmission of data on the communication media and is the lowest level in the communication process. The data is converted by a modem 36, transmitted across a telephone line 38 and then converted again by a modem 40 for transmission to the local site. A communication control unit 46 receives the transmission and passes it to a personal computer 48. A Target System Control Facility/PC (TSCF/PC) 50 runs on personal computer 48, receives the function commands originally transmitted from central computer 28 and converts them into keystrokes which are the same type as those generated by local processor console 16 in response to keyboard inputs on local processor console 16. The TSCF/PC program also includes a terminal emulator program which arranges the keystrokes for transmission to local processor console 16. At this point, the keystrokes are in the same form as if they were input via a keyboard on local processor console 16 and arranged by microcode within local processor console 16. The interface between personal computer 48 and local processor console 16 is provided by an IBM device cluster adapter (DCA) 52 and an IBM 3270 adapter card 54. It should be noted that the transmission is in the form of an IBM 3270 data stream which is a field by field definition format.

The prior art network 10 also includes a work station controller 18 which is hardware and microcode such as an IBM 3274 Control Unit to provide an interface to the operating system 14 of processor central electronic complex 13. The operating system 14 occasionally requires information such as time of day and an order to do jobs, and can obtain the information from a local operator by displaying the request on a CRT screen 37. To make the display, the operating system 14 sends a 3270 data stream to the work station controller 18 by way of processor CEC 13, and the work station controller drives a device cluster adapter 23 attached to the work station controller. Device cluster adapter 23 includes a hardware interface and microcode within the work station controller to control the exchange of data with screen 37 according to predefined protocols. Then, the operator can enter the required information via a keyboard 17 pursuant to the displayed request. The resultant keystrokes are sent to operating system 14 via device cluster adapter 23 and work station controller 18.

Work station controller 18 can also be remotely controlled by a program command from central computer 28 to provide the aforesaid information to operation system 14. The first step for the remote control is for TSCF/PC 50 to copy a screen buffer in work station controller 18 via DCA 35, and transmit the appropriate screen to TSCF 19. Then, application 31 can read the request and respond with the information. Alternately, TSCF can read the screen information and cause a corresponding display on screen 33, and a remote operator at central computer 28 can enter the information via keyboard 29. In either case, the information is transmitted to operating System 14 via personal computer 48 and the inefficient manner noted above. TSCF/PC 50 converts the command into keystrokes and transmits the keystrokes to the work station 18 via DCA 35 (which is equivalent in function to DCA 23). Then, work station controller 18 sends the keystrokes to operating system 14, and operating system 14 uses the keystrokes as an input to the operating system as if the keystrokes originated from keyboard 17.

Figure 2:
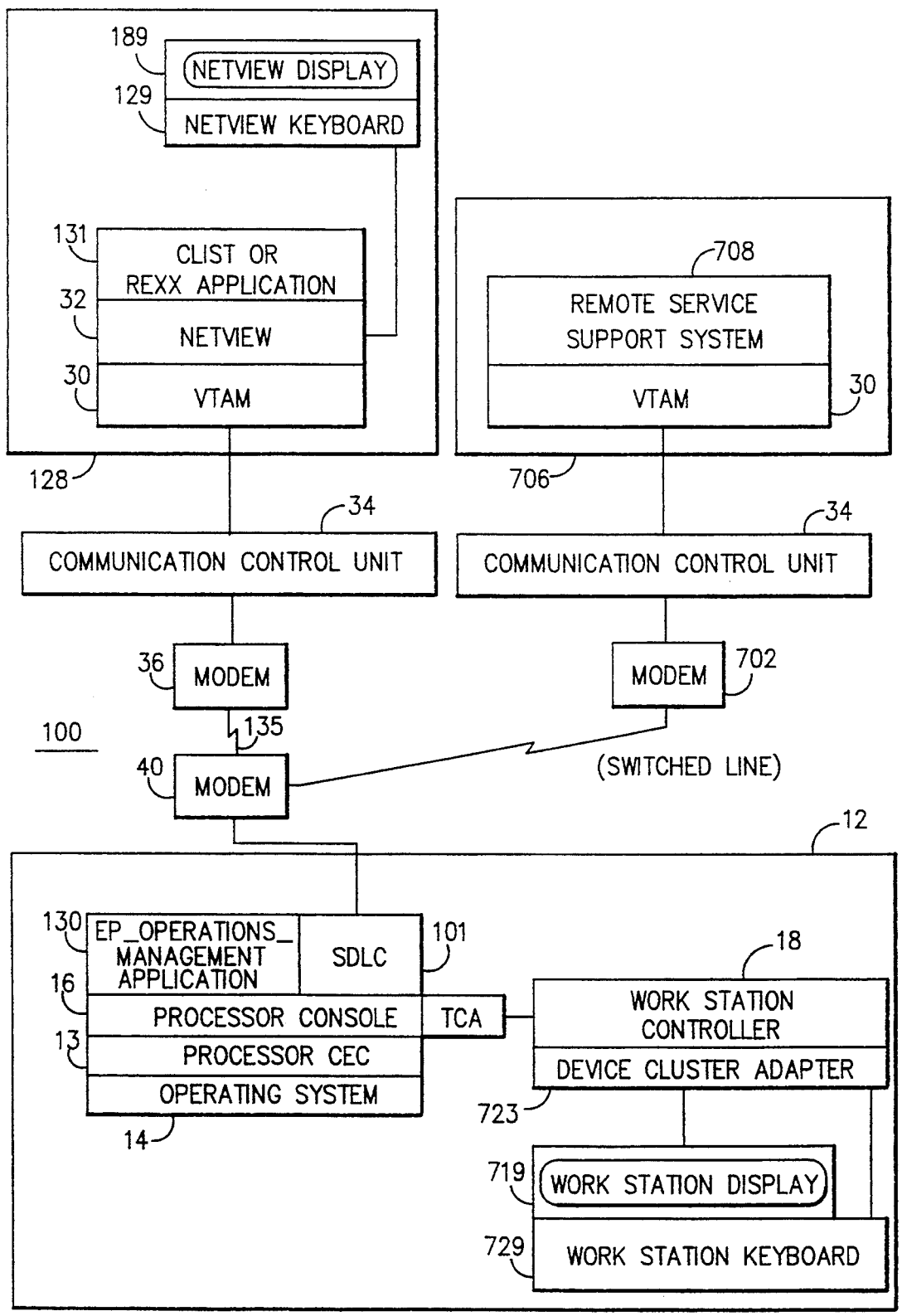
FIG. 2 is a block diagram of a computer network providing remote control of a computer processor according to the present invention.

FIG. 2 is a block diagram illustrating a computer network generally designated 100 according to the present invention which network provides remote control of computer processor 13. Computer processor 13, operation system 14 and local processor console 16 are described above. By way of example, local processor console 16 is an IBM PS/2 computer having an IBM operating system such as IBM OS/2 Extended Edition 1.2 operating system which is described in detail in a package of publications entitled "OS/2 EE 1.2 End User Pubs" IBM publication #S01F-0285.

In network 100, an SNA System Services Control Point to Physical Unit (SSCP-PU) session (defined by a Systems Network Architecture publication entitled "SNA Format and Protocol Reference Manual Management Services" which is available from IBM Corp., publication #SC30-3346) is established to provide direct communication between a central site computer 128 and processor console 16, without using the communication control unit 46, personal computer 48, or adapters 52 and 54 of the prior art network 10. Central computer 128 uses the NetView program 32 to accept a "RUNCMD" command, encode it into Network Management Vector Transport (NMVT) form, and cause it to be transmitted through VTAM 30 to local processor console 16 (or other node in the network). The NMVT form is defined in a document entitled "Systems Network Architecture Formats" which is available form IBM Corp., publication #GA27-3136. Processor Console 16 contains an SNA network addressable device (or physical unit) (FIG. 6) which is a node manager to receive management services communications, such as the NMVT communication, from VTAM 30. A synchronous Data Link Control (SDLC) 101 port is used to input data to and output data from local processor console 16. SDLC is a data transmission protocol used to exchange blocks of data between communication partners. For further details of the protocol, reference can be made to "IBM Synchronous Data Link Control General Information", IBM Publication #GA27-3093. The SDLC 101 includes a hardware interface or adapter card which receives the electrical data signals from modem 40 and converts them to control signals and blocks of data according to the SDLC protocol. Local processor console 16 receives the command in NMVT form from the management services interface and interprets the command according to rules defined by the receiving processor architecture. Those architectural rules comprise the meanings of the commands as described in more detail below, and the hardware level microcode which uses standard C programming techniques and language of local processor console 16. The commands originating from central computer 128 and defined below are designed for ease of use by computer program 131 running on central computer 128 to provide a true program interface, and are not constrained by human operator needs. Thus, it is not necessary to emulate an operator typing on a console in order to use architected commands and controls of local processor console 16. The interpreted command is validated, security checked and converted into the internal processor function requests (hardware level microcode) necessary to accomplish the request. Then, after the internal function(s) are completed, the internal processor function of the local processor console reports the success or failure of the function and returns these reports to the central computer 128. It should be noted that the internal report is converted to an externally understandable report as defined by the local processor console architecture and included in an NMVT form for return to NetView program 32 running on central computer 128. When NetView program 32 receives the report, NetView program 32 returns it to the issuer of the RUNCMD command, either a program 131 running on central computer 128 or an operator inputting through a keyboard 129 on computer 128. Consequently, in accordance with the main object of the invention the remote control is more efficient and faster than network 10 of the prior art.

The following is a more detailed description of network 100. FIG. 2 illustrates a "CLIST" program or "REXX" exec program 131 which runs on central computer 128 to provide automatic control of computer processor 13. Either program can generate the following high level commands:

ACTIVATE

Activate a Central Electronic Complex (CEC) node or subset of a CEC node. Activation usually includes a power on of the processor, an Initial Microprogram Load (IML) of the processor and an Initial Program Load (IPL) of the processor. Activation may also include the definition and the IPL of one or more logical partitions if the target processor is capable of supporting logical partitioned mode.

CMD

Sends a text command to the operating system application (191 in FIG. 6) which causes the text to be entered on the operating system console terminal command line.

DEACTIVATE

Deactivate a CEC node or subset of a CEC node.

SETCLOCK

Set a time-of-day or other clock in the CEC node or in the processor console.

CANCEL

Terminate a previously requested operation, or remove previously entered commands from a pending time execution queue.

POWERON

Power on a CEC node or a subset of a CEC node.

POWEROFF

Power off a CEC node or a subset of a CEC node.

EXTINT

Initiate an external interrupt function in the CEC node or partition.

SYSRESET

Reset a CEC node, a subset of a CEC node, or a CEC image.

Note: A CEC image is the architectural term for the CEC resources used to support a single control program. A CEC initialized to the ESA/370 mode has a single CEC image. A CEC initialized to the logical partition (LPAR) mode may have more than one CEC image.

LOAD

Perform the IPL function to a designated CPU or partition.

PROFILE

Perform a requested action on a specified profile. A profile is a collection of related operands to be taken as a group to modify the actions of an associated command verb.

QUERY

Returns information about the target system. A QUERY directed to the processor console application (211 in FIG. 6) returns processor identification as well as current processor status. A QUERY directed to the operating system application (191 in FIG. 6) returns the current contents of the operating system console terminal screen.

RESTART

Generate a restart interruption to a designated CPU or partition.

SERVICE

As described in more detail below, this command authorizes the local processor console to contact a service support center 706 (FIG. 2) for the purpose of requesting service or requesting new levels of microcode. In response to this commands, the local processor console calls a Remote Support Facility (RSF) 241 program (FIG. 6) which is a microcode component that communicates with the remote service support system 708 using the SDLC 101 in the local processor console 16 and the modem 40 attached to the processor console. The RSF program obtains cause of failure information from problem analysis microcode 243 (in FIG. 6), and communicates this information along with the machine type, model number, serial number, customer name and address, and contents of relevant error logs, to the remote service support system 708.

STORESTATUS

Perform the store status function to a designated CPU or partition.

START

Perform the start function to a designated CPU or to all CPUs.

STOP

Perform the stop function to a designated CPU or to all CPUs.

RESERVE

Figure 6:
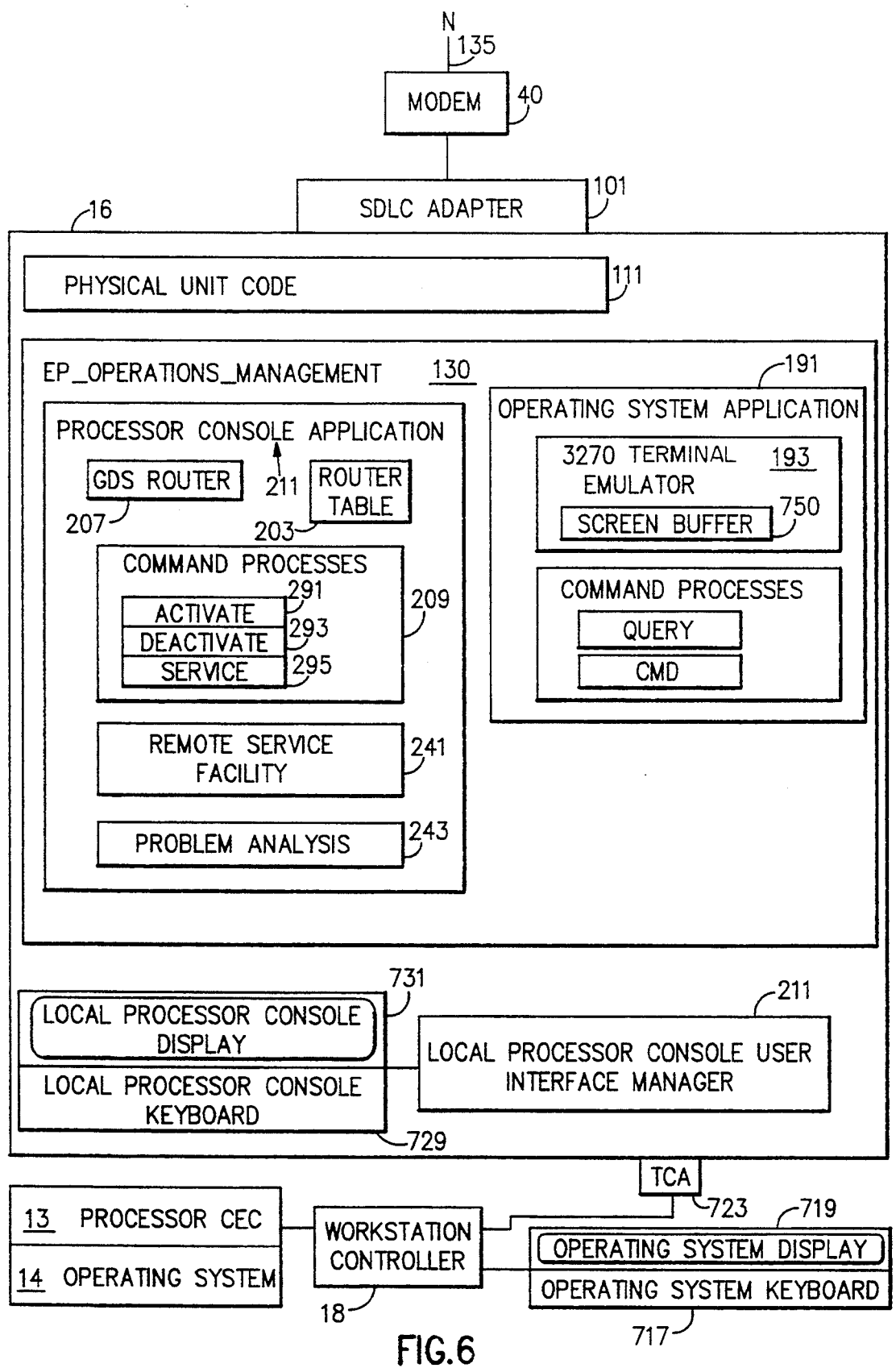
FIG. 6 is a block diagram illustrating in more detail a local processor console (16) of FIG. 2.

Request exclusive control of the processor console application 211 in FIG. 6 to ensure continuity of control between other commands.

ITIMER

Enable/disable a System/370 mode interval timer on a designated CPU.

Each of the commands has the following structure:

RUNCMD SP=address_of_service_point APPL=application verb operands

The NetView command, "RUNCMD", instructs NetView program 32 to send the verb and operands to the "application" in the addressed "service point".

For example, RUNCMD SP=123 APPL=456 Activate Force(No)

Where: "SP=123" component indicates that the service point of the recipient node is identified by the address "123", and this identification is used by VTAM 30 to identify local processor console 16. The "APPL=456" component identifies an application within local processor console 16 which should receive the verb and operands. "Activate" is a command or verb to control or operate computer processor 13 and "Force(NO)" is an operand that further qualifies the "Activate" verb to indicate that the command should not be forced but rather should be instituted only when the processor is not operating. However, if the force parameter value was "YES", then the Activate command would interrupt computer processor 13.

The command structure set forth above is then passed by NetView program 32 to VTAM communication facility 30. VTAM communication facility 30 reads the "SP" and "APPL" components of the command structure to determine the destination of the command structure and transmits the command structure to local processor console 16. It should be noted that VTAM communication facility 30 uses an SNA SSCP-PU session to provide the aforesaid transmission by direct communication to local processor console 16. Modems 36 and 40 are used on opposite ends of telephone line 135 which in network 100 is a switched line (one for which the user pays a toll charge to the telephone company). However, if desired, network 100 could also be a leased line, local area network or other similar communication facility.

Local processor console 16 receives the aforesaid command structure, and an application EP_Operations_Management program 130 in FIG. 6 running on processor console 16 converts the high level command, Activate and operand Force(NO), to low level, internal function commands/steps (low level hardware microcode). The low level internal function commands/steps are a series of steps at the microcode level within the local processor console 16 which accomplish the high level command function. For example, the "ACTIVATE" high level command function would be converted by EP_Operations_Management program 130 in FIG. 6 into a series of steps which would accomplish "power-on" of the processor 13 hardware, a series of steps which accomplishes an initial microprogram load (IML) function and a series of steps which accomplishes an initial program load (IPL) function. These steps are directly implemented by other microcode and hardware within local processor console 16 to control and operate computer processor 13. These commands/steps comprise corresponding C programming steps.

As an alternate to use of the CLIST or REXX exec program to designate the high level commands, an operator can designate the high level command by typing the NetView command "RUNCMD" and the other components of the aforesaid command structure on NetView keyboard 129. From then on, the description of network 100 is the same as provided above for the CLIST or REXX exec case except that the response to the RUNCMD is routed to NetView Display 189 by NetView 32.

Figure 3:
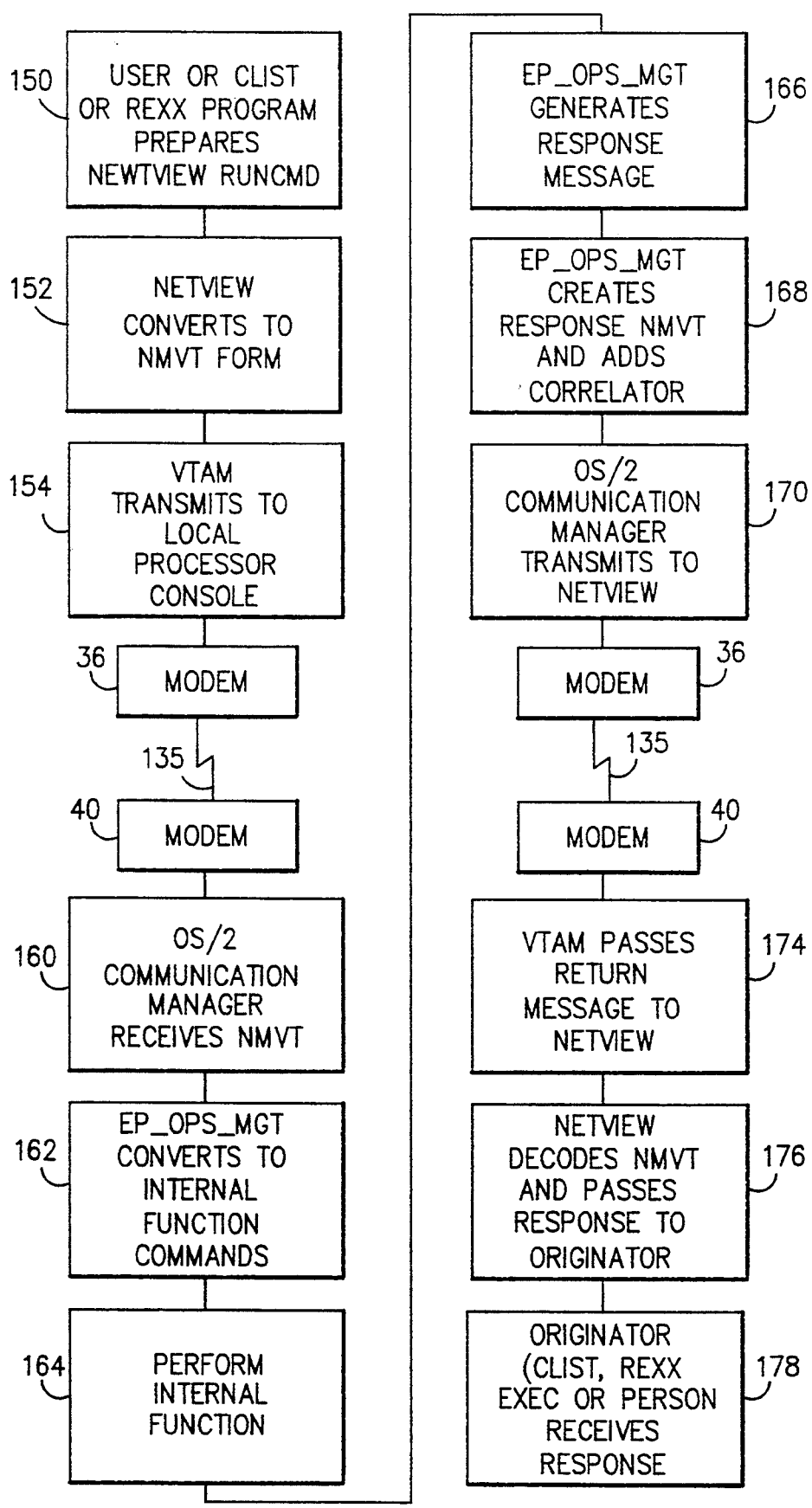
FIG. 3 is a flow diagram illustrating the flow of information and the steps for implementing remote control of the computer processor provided by the network illustrated in FIG. 2.

FIG. 3 illustrates in more detail the flow of information from central computer 128 to computer processor 13 and the flow of return messages from local processor console 16 to central computer 128. In a step 150, the aforesaid command structure is formed either by the CLIST or REXX exec program or via keyboard input. Also in step 150, NetView program 32 recognizes the "RUNCMD" component of the aforesaid command structure and converts the aforesaid command structure to a standard SNA NMVT structure. NetView program 32 adds a correlator to identify the aforesaid command structure for future references, stores a copy of the correlator and command structure in its local storage, and passes the NMVT command structure to VTAM communication facility 30 (step 152). VTAM communication facility 30 with assistance from communication control unit 34 transmits the NMVT command structure to local processor console 16 (step 154). The protocol of the transmission uses The SNA SSCP-PU session.

A Communication Manager portion of the OS/2 operating system within local processor console 16 receives the NMVT command structure and passes it, virtually unchanged to an EP_Operations_Management program 130 (in FIG. 6) running on local processor console 16 (step 160). In response, the EP_Operations_Management program 130 (in FIG. 6) reads the high level command of the NMVT command structure which in the aforesaid example is "Activate" with operand "Force(NO)", and converts the high level command into internal function commands/steps (step 162). Next, local processor console 16 performs the internal function command/steps (step 164). In the illustrated example, after these function command/steps are completed, computer system 12 is activated.

Next, the EP_Operations_Management program 130 generates a message (step 166) of the general type:
CSAAXXXX VERB STATUS (COMPLETION_STATUS)
SP(SERVICE—POINT)
APPL(APPLICATION)
CONDITION(CONDITION—REPORT)
For example:
CSAA0001 ACTIVATE STATUS(FAILED) SP(123) APPL(456)
CONDITION(001100C0010002)

The return message includes a "STATUS" indicating whether the original command was successful or unsuccessful and if necessary a "CONDITION" detailing the reason for failure and a message identifier (CSAA0001) to identify the command structure to which the return message relates. Next, the EP_Operations_Management program converts the return message to NMVT form, adds the aforesaid correlator from the original request and passes the converted message to the Communication Manager program portion of the OS/2 operating system (step 168). In response, the Communication Manager program sends the converted message to VTAM communication facility 30 via modem 36, switched telephone line 135 and modem 40 (step 170). This occurs through an SSCP-PU session (step 170). Next, VTAM communication facility 30 passes the NMVT return message to NetView program 32 (step 174), and NetView program 32 decodes the NMVT message, and extracts the correlator and text of the report. Using the correlator, NetView program 32 then identifies the message as a response to the original command structure (step 176). NetView program 32 then passes the message to the originator of the original command structure, the CLIST program, the REXX exec program or the operator as the case may be. (The operator receives the message on a display screen 189 on central computer 128.)

Figure 4:
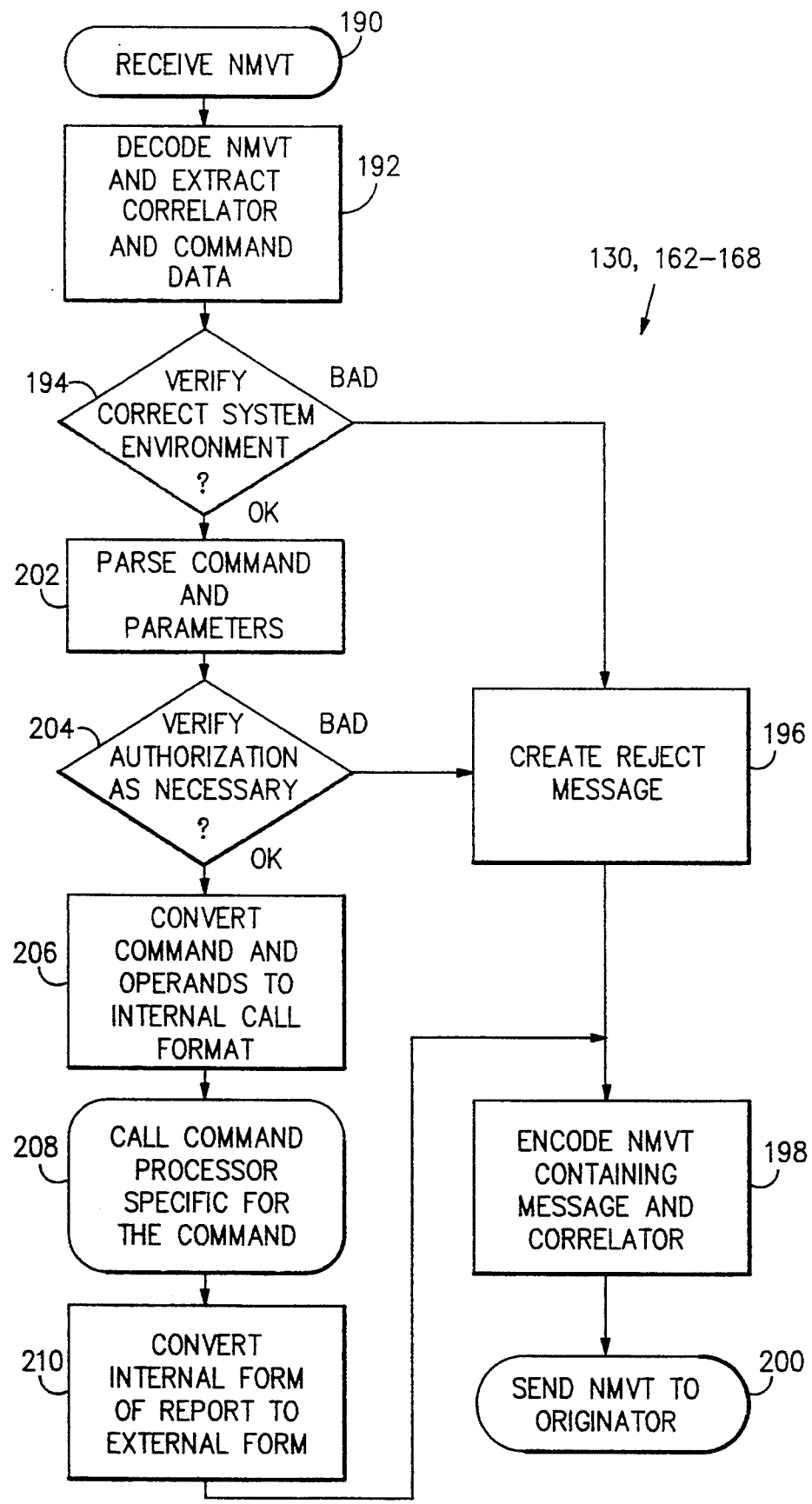
FIG. 4 is a detailed flow chart further defining an EP_Operations_Management function of FIG. 3 (steps 162–168).

FIG. 4 illustrates the EP_Operations_Management program 130 (steps 162–168 of FIG. 3) in more detail. After receiving the command structure in NMVT form (step 190), the EP_Operations_Management program 130 decodes the command structure and extracts the correlator and the command and operand data (step 192). Then, the EP_Operations_Management program determines if the environment at the processor console 16 is properly established to accept these types of commands. By way of example, there may be checks to ensure that automated operations are enabled in the processor console, or to ensure that no other commands are in progress (decision block 194). If the environment is not proper, program 130 creates a reject message (step 196) which it encodes into NMVT form with the correlator (step 198) and sends the message to the originator (step 200). Referring again to decision block 194, if the environment is proper, then decision block 194 leads to step 202 in which the EP_Operations_Management program 130 parses the incoming command string into the verb and it associated operands (step 202). Next, EP_Operations_Management program 130 verifies that the requestor has the proper security authorization to access the processor console (decision block 204). If there is no authorization, then the EP_Operations_Management program 130 creates a corresponding reject message in step 196 and then executes steps 198 and 200. If there is authorization, then the EP_Operations_Management program 130 converts the commands to internal call format (step 206), determines, via a router table (block 203 in FIG. 6), which microcode function to call to interpret the command, executes the machine microcode (step 208) and obtains the returned internal completion report. Next the EP_Operations_Management program 130 converts the internal report of the success or lack of success of the internal command to the aforesaid return message (step 210). Next EP_Operations_Management encodes the return message into NMVT form with the correlator (step 198), and sends the encoded report to the originator (step 200).

Figure 5B:
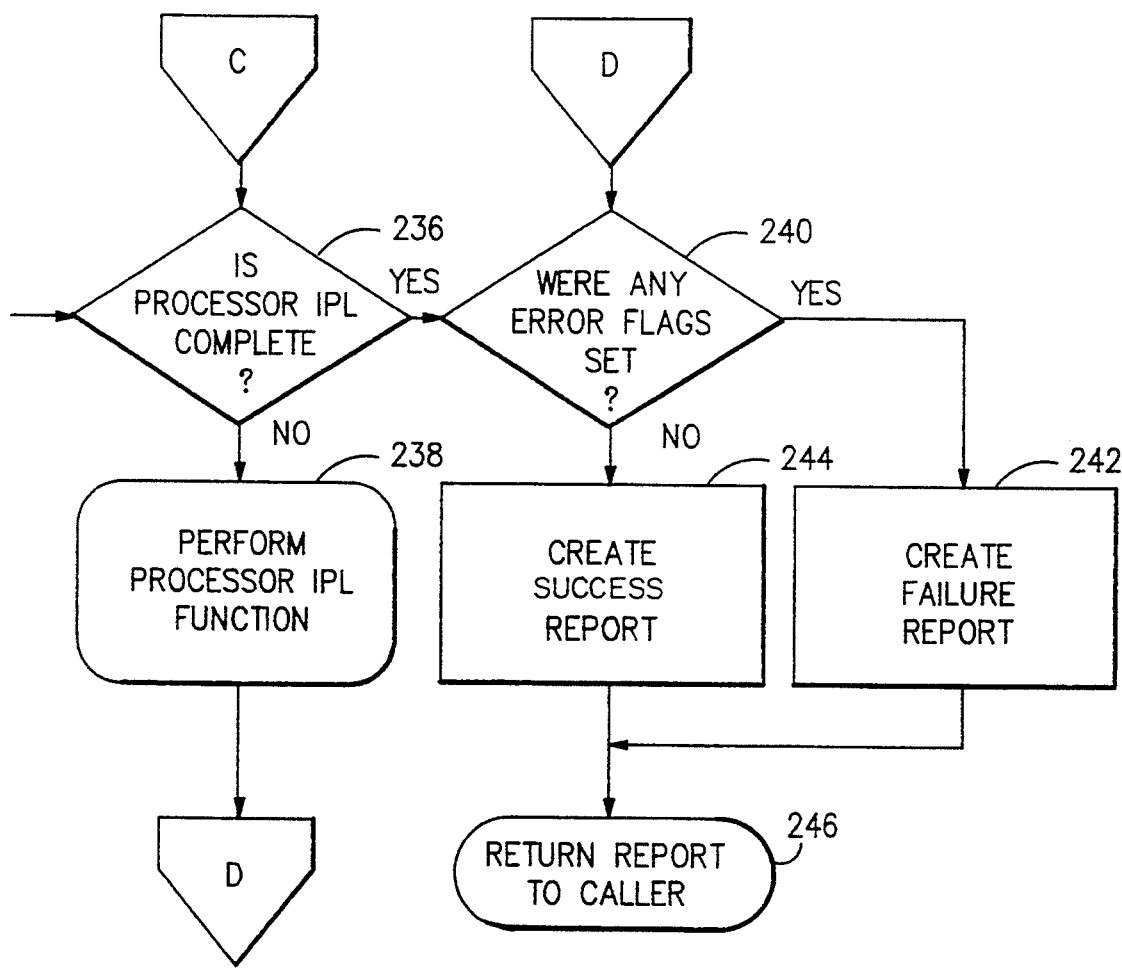
FIGS. 5A and B are a flow chart further defining an internal function performance step of FIG. 3 (step 164).

The following is a description of step 206 in more detail with reference to FIG. 6. Steps 192–206 of FIG. 4 are performed by a processor console application function 211 within EP_Operations_Management program 130 when the command operates upon hardware within local processor console 16, and by operating system application 191 when the command affects operating system 14 within computer system 12. The EP_Operations_Management program 130 receives the extracted command data, and converts the data into a generalized data stream which is a structure defined by SNA and a publication entitled "Systems Network Architecture Formats" by IBM Corp., Armonk, N.Y., publication #GA27-3136. The generalized data stream contains fields and values that are self-identified i.e. each field is identified by a unique registered identifier (unique name assigned to the field). For example, one such identifier can be "command" and the value can be "Activate". Then, the EP_Operations_Management program 130 passes the generalized data stream to a GDS router function 207 which is also comprised of microcode within local processor console 16. It should be noted that GDS router function 207 can receive a generalized data stream from other sources such as a keyboard 729 (FIG. 6) via local processor console user interface manager 211. Such a user interface manager 211 is described in more detail in copending U.S. patent application entitled "User Interface for Operating a Computer Processor" filed by Bernice E. Casey, Gregory L. Dunlap and Sammy L. Rockwell on Sep. 4, 1990, which patent application is hereby incorporated by reference as part of the present disclosure. Then, GDS router function 207 searches by name for the "command" field and the value which follows it. Listed above are various commands including Activate, Deactivate and Service. Then, GDS router function 207 consults a router table 203 to determine the address of a block of microcode which implements the command. For example, FIG. 6 illustrates a block of microcode 291 which implements the Activate command, a block of microcode 293 which implements the Deactivate command, and block of microcode 295 which implements the Service command. After determining the address of the microcode block, GDS router function 207 passes control to the local processor console processor to execute the microcode at the appropriate address. The microcode which implements the activate command are illustrated in FIGS. 5A and B. As noted above, the Activate command comprises three basic components—POWER ON, IML and IPL. The microcode which implements each of these basic components and therefore the Activate command are illustrated in FIGS. 7A and B, 8 and 9A and B, respectively below.

FIGS. 5A and B illustrate in more detail the processing in step 208 for the Activate command. The command is sent to an Activate processing function (step 220), and in response, the Activate processing function initializes processing flags (step 222). Next, the function determines if the operands, i.e. Force(NO), are valid (decision block 224), and if not sets an error flag for invalid operands (step 226). If the operands are valid, then the function determines if the power for the processor to which the Activate command pertains is on (decision block 228). This determination is made by interrogating internal hardware power sensors and microcode status indicators. If not, the function initiates a microcode process to turn the processor power on (step 230). If the processor power was on (decision block 228, yes leg) or after the completion of the processor power-on process (step 230), the Activate function determines if the initial microprogram load (IML) has been completed by interrogating internal status indicators (decision block 232). If IML is not complete, the internal process to perform the processor initial microprogram load (IML) is initiated (step 234). If the processor IML was complete (decision block 234, yes leg) or after the completion of the processor IML function (step 234), the Activate function determines if the processor initial program load (IPL) has been completed by interrogating internal status indicators (decision block 236). If IPL is not complete, the internal process to perform the processor initial program load is initiated (step 238). If the processor IPL function was complete (decision block 236, yes leg) or after the completion of the processor IPL function (step 238), the Activate function then determines if any error flags were set (decision block 240). Error flags result from invalid operands (via step 226) or from errors encountered in the POWER-ON, IML or IPL processes. If there are any error flags, then the function creates a corresponding internal failure report (step 242) which is passed to the EP_Operations_Management program to decode and format similarly for all of the individual functions. Similarly, if there are no error flags, then the function creates a success report (step 244) which is passed to the EP_O- perations—Management program. The report is passed to the originator (step 246).

Figure 7A:
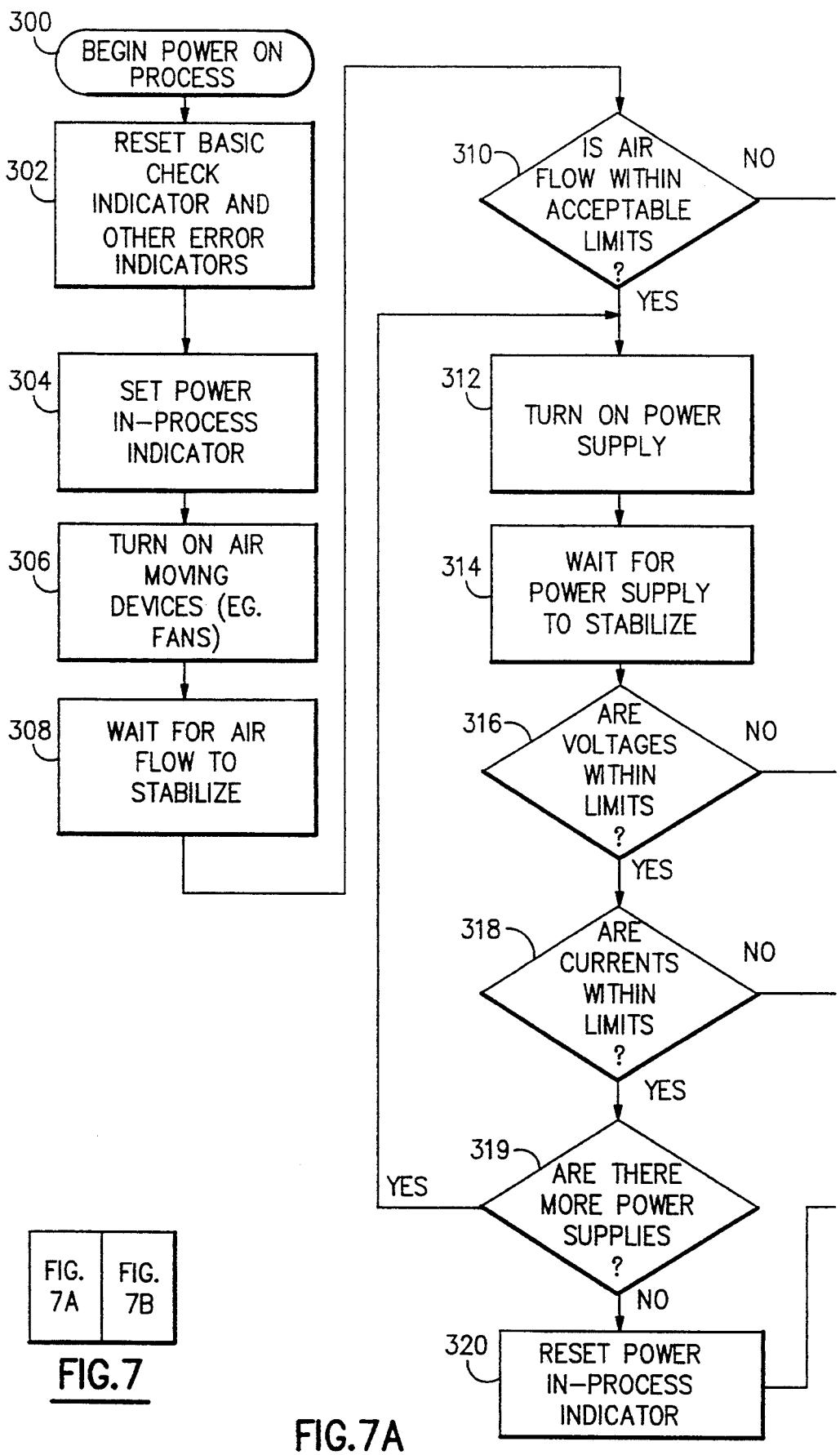
FIGS. 7A and B are a flow chart further defining a Perform Processor Power on function (step 230) in FIG. 5A.
Figure 7B:
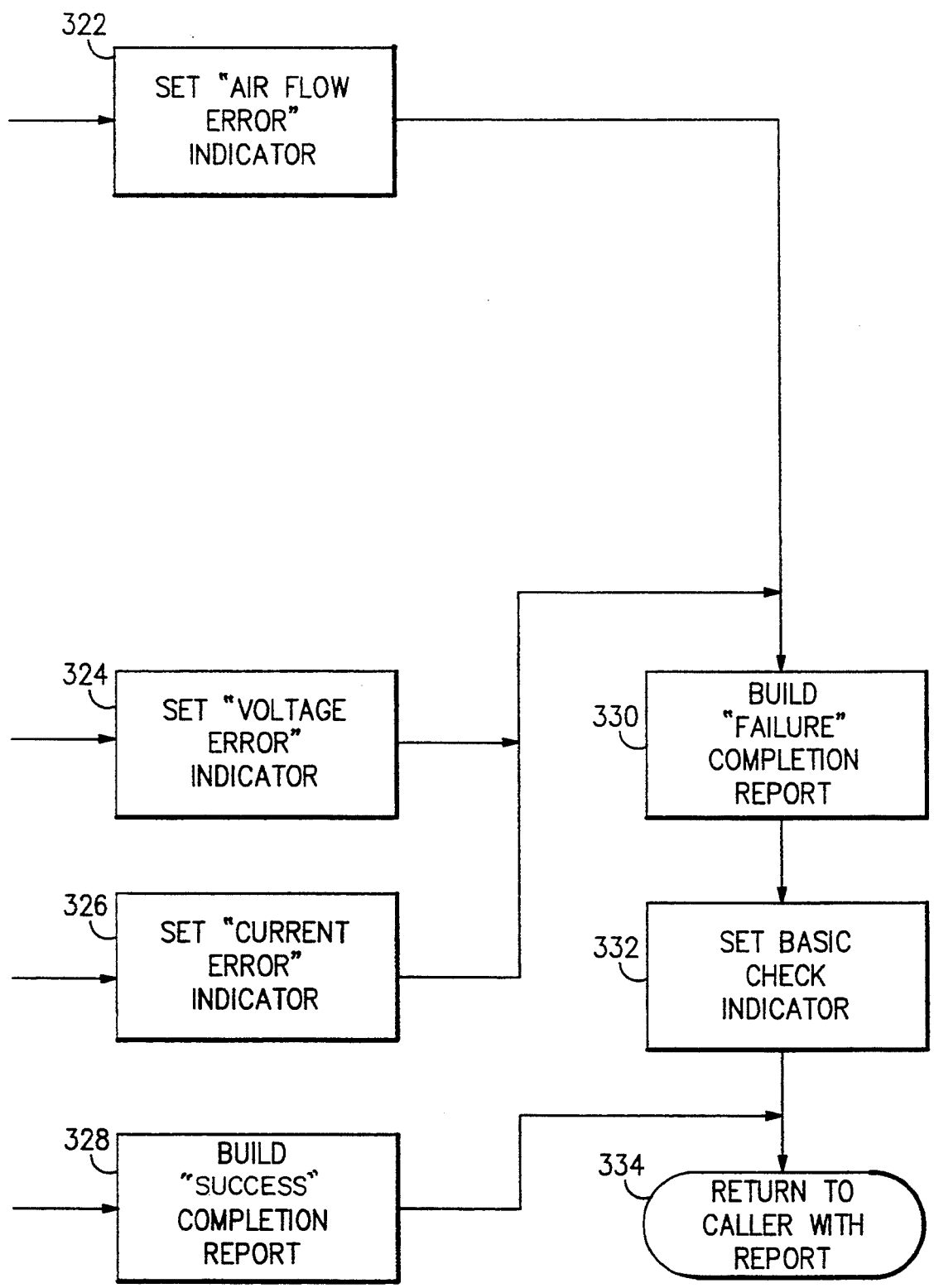

The power-on process 300 illustrated in FIGS. 7A and B is called whenever the processor power in CEC 13 is to be turned on. First, an external "Basic Check Indicator" is reset and all error indicators are reset (step 302). Next, an external "power-in-progress" indicator is set to show that a power-on sequence is occurring (step 304). Next, the air moving devices (i.e. cooling fans) are turned on (step 306), and the power on process waits a predetermined period until the air flow stabilizes (step 308). Next, the air flow is checked against internal specifications to ensure that it is adequate (decision block 310). If the air flow is not adequate, an external "airflow error" indicator is set (step 322), a "failure" completion report is built (step 330), an external "basic check" indicator is set (step 332) and a report is returned to the caller (step 334) indicating whether the power on process was successful. Returning to step 310, if the air flow is adequate, the power supply is turned on (step 312) and the power on process waits a predetermined period until the power supply stabilizes (step 314). If the power supply voltage is outside the internal specifications (decision block 316), an external "voltage error" indicator is set (step 324), a corresponding failure report is built (step 332), the "Basic Check Indicator" is set, and return with report is made to the caller (i.e. GDS router 207) (step 334). Returning to decision block 316, if the voltage is within limits, the current is checked to determine if it is within the internal specifications (decision block 318). If the current is outside specifications, an external "current error" indicator is set (step 326) and (steps 330–334 are executed as above). Returning to decision block 318, if the current is within specifications, it is determined if there are additional power supplies to be turned on (decision 319). If no more are to be turned on, the external "power in progress" indicator is reset (step 320) and a "success" completion report is built (step 320) and returned to caller (step 334). If multiple power supplies are involved in the machine design, steps 312–319, are repeated for each power supply.

Figure 8:
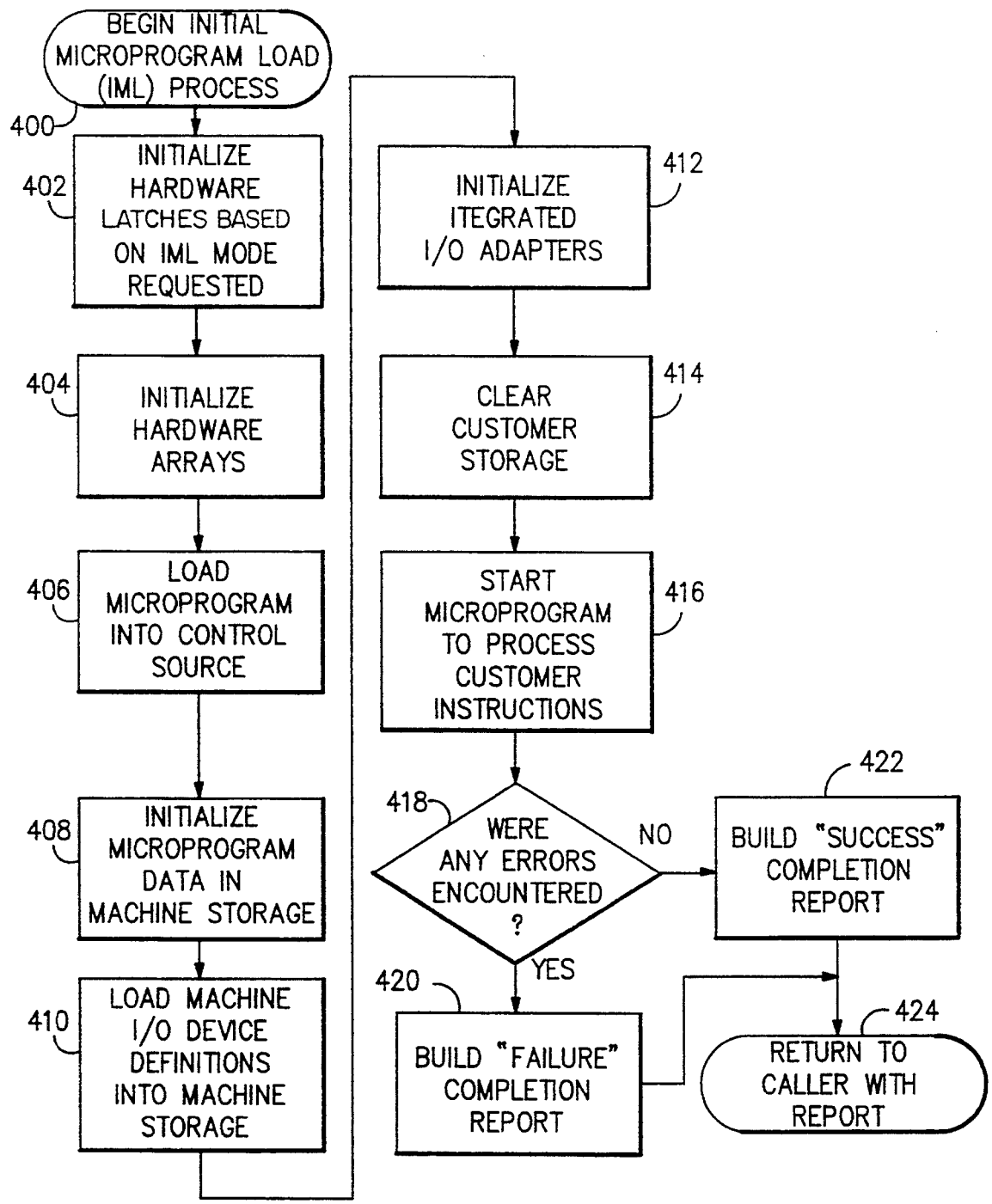
FIG. 8 is a flow chart further defining a Perform Processor IML function (step 234) in FIG. 5A.

The initial microprogram load (IML) process 400 illustrated in FIG. 8 is called whenever the processor in CEC 13 is to be initialized. First, hardware latches are set to the necessary initial state, based on the requested IML mode (step 402). Next, all hardware arrays are set to their initial state (step 404). Then the hardware microprogram is loaded into the machine's control storage (step 406). Next, the microprogram data areas are set to an initial state (step 408). Then, the definitions for the machine's I/O devices are loaded into machine storage (step 410). Next, all the integrated I/O adapters are initialized (step 412). Next, all the customer storage is initialized (i.e., cleared to zeros) (step 414). Next, the microprogram (that was loaded by step 406) is started so that it is ready to process customer instructions (step 416). If any errors were encountered, (decision block 418), then a "failure" completion report is built (step 420) and returned to the caller (step 424). If, in decision block 418, no errors were encountered, then a "success" completion report is built (step 422) and returned to the caller (step 424).

Figure 9A:
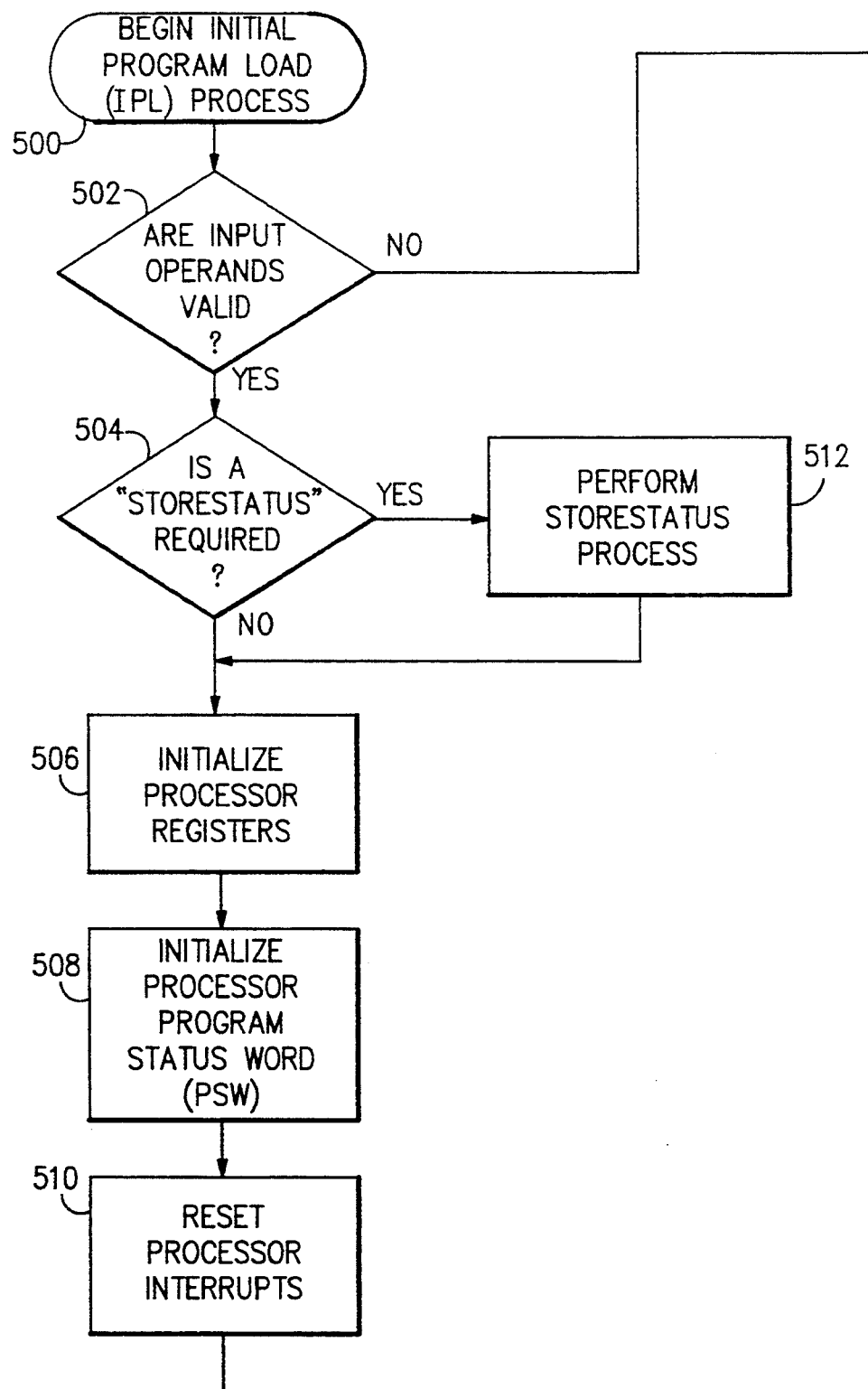
FIGS. 9A and B are a flow chart further defining a Perform Processor IPL function (step 238) in FIG. 5B.
Figure 9B:
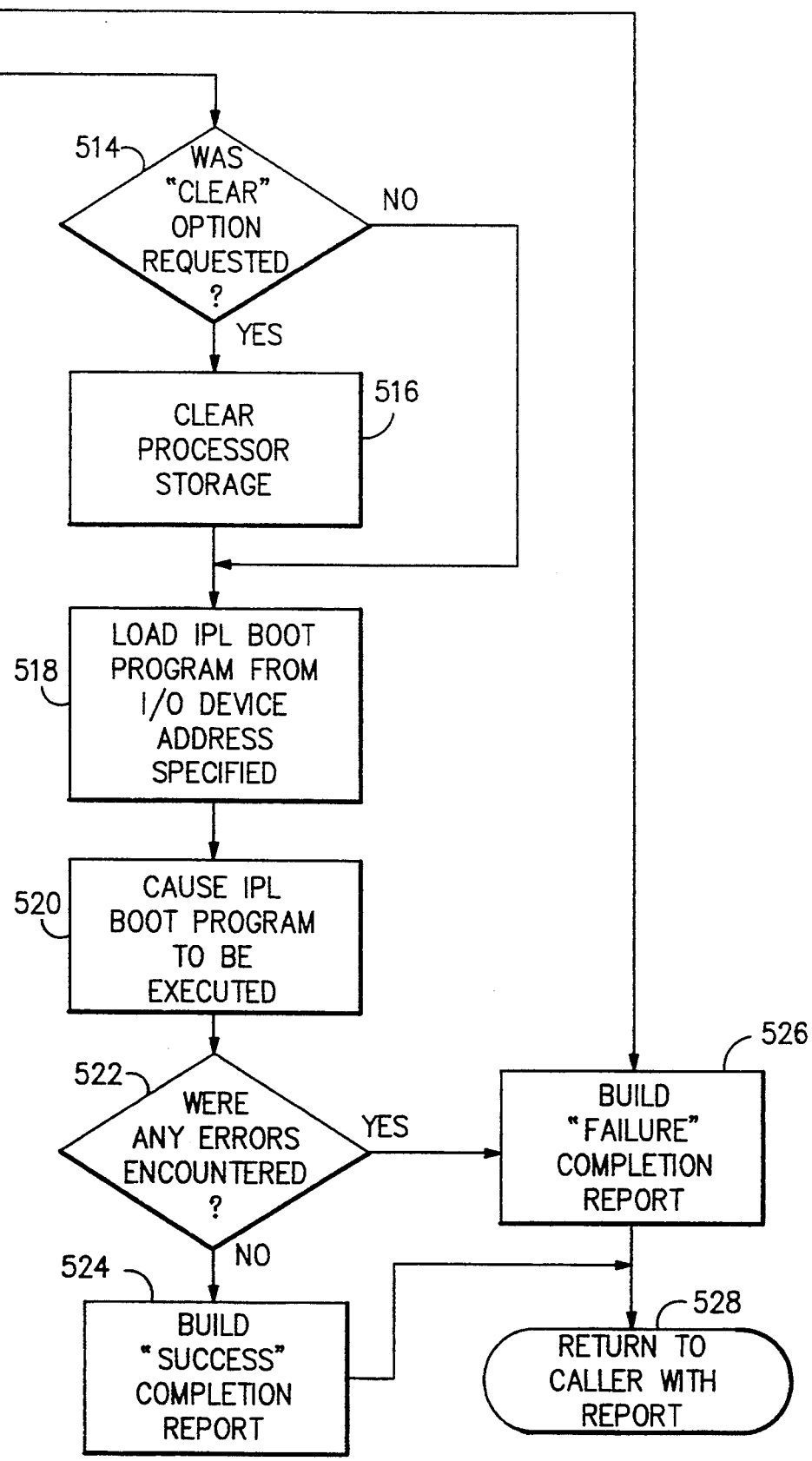

The Initial Program Load (IPL) process 500, illustrated in FIGS. 9A and B, is called whenever it is desired to load and run an operating system in the processor (CEC 13). First, any qualifying operands of the LOAD request are checked for validity (decision block 502), and if any are found to be invalid (decision block 502, no leg), then a "failure" completion report is built (step 526) and returned to the caller (step 528). Returning to decision block 502, if all operands are valid (decision block 502, yes leg), then it is determined (from internal status indicators) whether a "storestatus" process is necessary (decision block 504). If necessary, a "storestatus" process is performed (step 512). Whether or not a storestatus was required, the processor registers are initialized next (step 506). Then, a processor Program Status Word (PSW) is initialized (step 508). Next, all pending processor interrupts are reset (step 510). Next, it is determined (from the LOAD operands) whether customer storage must be cleared (decision block 514). If storage must be cleared, then the customer storage is reset to zeros (step 516). Whether or not storage was to be cleared, the IPL boot program subsequently is loaded into customer storage from the I/O address specified as an operand to the LOAD command (step 518). Next the IPL boot program is executed (step 520). If any errors were encountered (decision block 522) then a "failure" completion report is built (step 526) and returned to the caller (step 528). If no errors were encountered (decision block 522). then a "success" completion report is built (step 524) and returned to the caller (step 528).

Figure 10B:
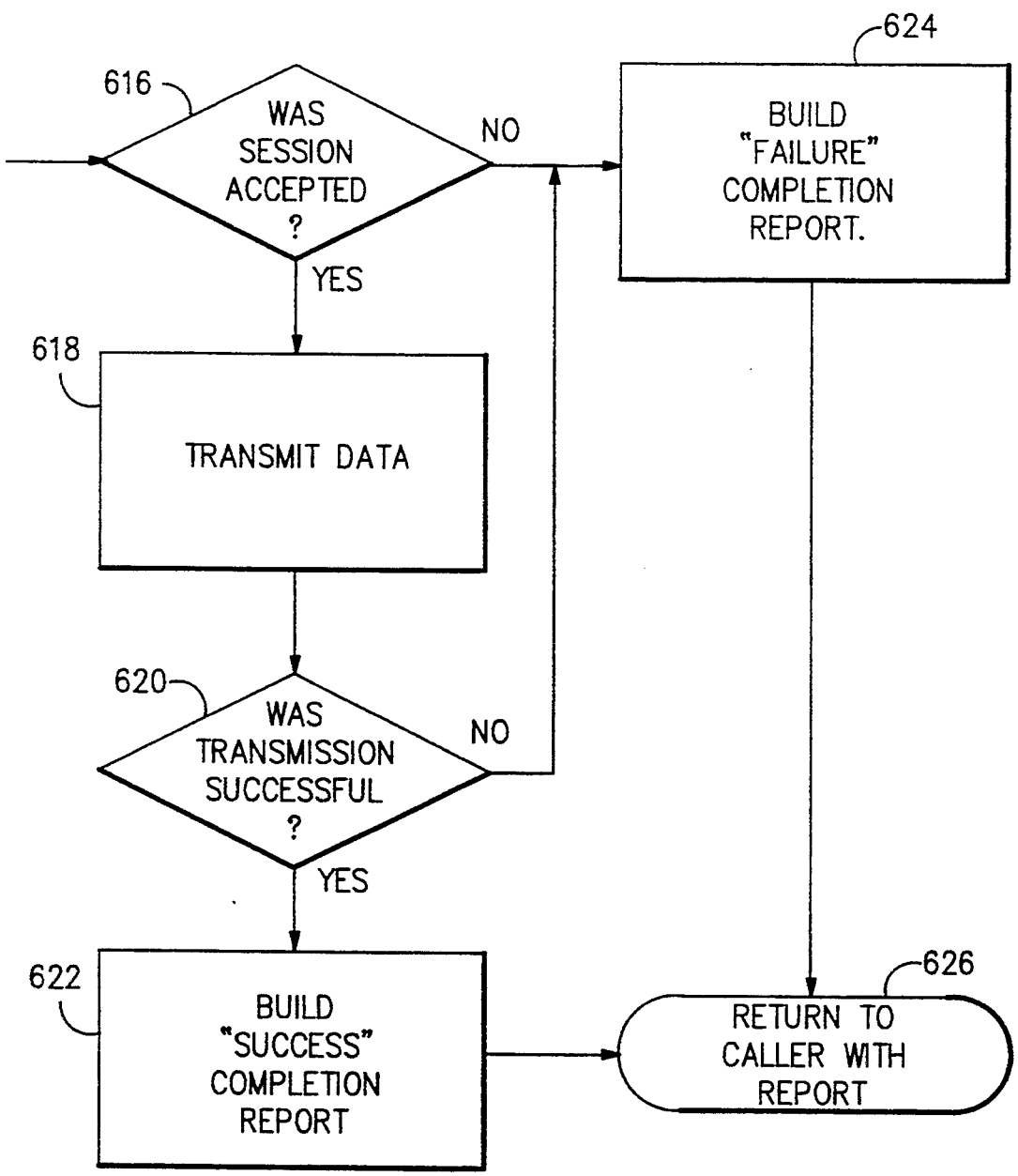
FIGS. 10A and B are a flow chart defining remote service facility processor for service authorization (blocks 295 and 241) in FIG. 6.

The Remote Service Facility process for service authorization 600 illustrated in FIGS. 10A and B is called whenever it becomes necessary to request hardware service from the service provider. First, basic information that specifically identifies the machine is gathered from internal information (step 602) and formatted for transmission. This basic information includes the machine type, machine model, and machine serial number. Next, basic information that specifically identifies the customer owning the machine is gathered from internal information and formatted for transmission (step 606). Next, internal error record information specific to the reason for the service request is gathered from internal information and formatted for transmission (step 606). Next, any pertinent storage dump or instruction traces are formatted for transmission (step 608). Next, it must be determined if the transmission facilities (SDLC adapter and modem) are available for use (decision 610). If they are not currently available, the remote service facility waits one minute and checks again. When they are available, the remote service facility initiates a connection to the remote service support facility using dial information stored previously (step 612). When a connection is made with the remove service support facility, the session will only be accepted if the machine is properly registered and authorized. If the session is not accepted (decision block 616), then a "failure" report is built and returned to the caller. If the session is accepted, then the data that was formatted previously by this request is sent to the remote service support facility (step 618). If the transmission completes without errors (decision block 620), then the remote service facility builds a "success" report and returns to the caller. If there were transmission errors, the remote service facility creates a "failure" report and returns to the caller.

FIGS. 2 and 6 also depict work station controller 18 attached to local processor console 16 to provide the interface to operating system 14. Operating system 14 occasionally requires information such as time of day and an order to do jobs, and can obtain the information from a local operator by displaying the request on CRT Screen 719. To make the display, operating system 14 sends a 3270 data stream to work station controller 18, and work station controller 18 drives a terminal cluster adapter 723 associated with the work station controller 18. TCA 723 is similar to DCA 23 described above in that both include a hardware interface and microcode to control the exchange of data across a coaxial communication facility according to predefined protocols. TCA 723 then drives a terminal emulator program 193 which drives the display (in the preferred embodiment, a display window on local processor console display 731). Then, the operator can enter the required information via keyboard 729, and the resultant keystrokes are sent to operating system 14 via terminal emulator program 191, TCA 723 and work station controller 18.

According to the present invention, work station controller 18 can also be remotely controlled by a program 131 at central computer 28 or an operator input via keyboard 129. The first step for the remote control is for program 131 or an operator via keyboard 129 to make a "query operating system" command to local processor console 16. This command is processed and transmitted to local processor console 16 in the same manner as the Activate command described above except that the command structure designates operating system application 191 as the target for the command within local processor console 16. In response, operating system application 191 extracts the current contents of the aforesaid operating system display from a screen buffer 750, and then operating system application 191 transmits the screen information, line by line, to central computer 128 via physical unit code 111, SDLC adapter 101, modem 40, line 135, modem 36, control unit 34, and VTAM 30. It should be noted that each line of the screen is transmitted as a message so as to preserve the screen position of each line. Then, program 131 or the remote operator analyzes the screen data, determines what action is appropriate, and transmits the requisite information as a "CMD" command designated for operating system application 191. The format for the command structure is the same as the other commands, except in this case, the originator must include a operand TEXT(. . . .) which contains the requisite information to be given to the operating system 14.

This information is transmitted to operating system 14 in the manner noted above for the query command. (The operating system command is passed from the operating system application 191 to the terminal cluster adapter 723 to the work station controller 18 and then to the operating system 14. Operating system application 191 converts the high level command to keystrokes to simulate keyboard input to the operating system keyboard, either 717 or 729 and the work station controller 18 converts the keystrokes to a 3270 data stream.

Based on the foregoing, a computer network and program embodying the present invention have been disclosed. However, numerous substitutions and modifications can be made without deviating from the scope of the invention. For example, if desired, the interpretation function of the EP_Operations_Manager 130 could be run on central computer 128, and the resultant hardware microcode function requests transmitted to local processor console 16 via NetView program 32, VTAM 30, control unit 34, modem 36, communication line 135, modem 40, SDLC adapter 101 and physical unit code 111. Therefore, the invention has been disclosed by way of illustration and not limitation and reference should be made to the following claims to determine the scope of the invention.

We claim:

1. A computer network comprising:
   a first computer comprising a first display screen;
   a second computer, coupled to said first computer and comprising a second display screen and program means or operator interface means for generating a command having a human readable verb, a parameter and data to request contents of said first display screen; and
   means for transmitting said command from said second computer to said first computer; and wherein
   said first computer includes means, responsive to said command, for generating a multiplicity of commands each having a human readable verb, parameter and message data, said data messages defining the contents, line by line, of substantially the entire first display screen;
   the transmitting means transmits said multiplicity of commands from said first computer to said second computer;
   said second computer includes means for displaying said screen contents without interpretation and means, responsive to said program means or operator interface means, for generating another command having a human readable verb, parameter, and data;
   the transmitting means transmits said other command from said second computer to said first computer; and
   said first computer includes means for converting said data of said other command into keystroke format to simulate keyboard input for said first display screen.

2. A computer network as set forth in claim 1 wherein said second computer includes means for controlling said second display screen to display, line-by-line, the data messages in said multiplicity of commands to replicate said first display screen.

3. A computer network as set forth in claim 1 wherein the data messages in said multiplicity of commands define the entire first display screen.

4. A method for transferring contents of a first display screen of a first computer to a second display screen of a second computer coupled to said first computer, said method comprising:
   using said second computer, generating a command having a human readable verb, a parameter and data to request contents of said first display screen;
   transmitting said command from said second computer to said first computer;
   using said first computer, generating a multiplicity of commands each having a human readable verb, a parameter and message data with respective data messages defining the contents, line by line, of substantially the entire first display screen;
   transmitting said multiplicity of commands from said first computer to said second computer;
   displaying said data messages without interpretation at said second computer;
   using said second computer to generate another command having a human readable verb, a parameter and data;
   transmitting said other command from said second computer to said first computer; and
   using said first computer to convert said data of said other command into keystroke format to simulate keyboard input for said first display screen.

5. A method as set forth in claim 4 further comprising the step of displaying, line-by-line, on said second display screen the data messages in said multiplicity of commands to replicate said first display screen.

6. A method as set forth in claim 4 wherein said multiplicity of commands define the entire first display screen.

* * * * *